July 11, 1967

R. L. FERM ET AL 3,330,070

METHOD OF APPLYING MULCH

Filed Dec. 29, 1965

INVENTORS
RICHARD L. FERM
SIDNEY V. SMITH
CHARLES E. MORAN

BY *H. E. Johnston*
*Edward J. Keeling*
ATTORNEYS

United States Patent Office 3,330,070
Patented July 11, 1967

3,330,070
METHOD OF APPLYING MULCH
Richard L. Ferm, El Cerrito, Sidney V. Smith, Yuba City, and Charles E. Moran, Richmond, Calif., assignors to Chevron Research Company, San Francisco, Calif., a corporation of Delaware
Filed Dec. 29, 1965, Ser. No. 517,314
3 Claims. (Cl. 47—9)

This application is a continuation-in-part of application Ser. No. 294,897, filed July 15, 1963, now abandoned.

This invention relates to improved agricultural methods and, more particularly, this invention relates to methods for selectively applying fluid mulch substances, such as petroleum based emulsions, to the soil to prevent crusting of the soil and to promote germination of seeds in agricultural practice.

Soil crusting is a widely occurring problem in agriculture and a serious obstacle to plant emergence and development. Formation of a crust after a field has been seeded interferes with and even precludes emergence and normal healthy growth of the seedlings. Germinated, sprouted seedlings are often unable to break through the crust and uneven and weak crop stands result. When uneven emergence of seedlings, and as a consequence non-uniform development and ripening, occurs, in the case of lettuce for instance, hand labor must be sent out to harvest the crop because a machine would be nonselective between the ripened and non-ripened portion. Obviously, this increases operating costs of producing the crop.

The problem of soil crusting has been recognized and many solutions have been advanced to solve it. One solution has been the application of a mulching fluid to the soil after seeding. Heretofore, the mulch or anticrusting agent has been uniformly applied to the field, either entirely or in regularly spaced bands running the length of the seed bed. The application of a mulching material to the field often overcomes the soil crusting problem. However, the above methods of applying the mulching material, which methods were heretofore thought necessary to obtain good results, resulted in waste of a large portion of the mulching material. Further, in the case of certain agricultural products such as lettuce, etc., where the common practice is to plant a continuous row of seeds, allow them to germinate and emerge, and then to thin the seedlings out by hand so that plants remain only at selected intervals, the previously practical methods of applying a mulching material over the entire row of seeds did nothing to solve the problem of later thinning the crop. Further problems that are associated with applying the mulching agent in the above manner include the large quantity of mulch needed to cover the field and the resulting high weight of the equipment for applying it.

It is a particular object of this invention to provide methods for applying petroleum based emulsions to the soil of a seed bed in spots having limited areal coverage and spaced apart at predeterminable selected intervals.

Briefly, the present invention comprises the steps of establishing a movable reservoir of a petroleum based emulsion having a viscosity within a preselected range, moving the reservoir over a soil surface containing planted seeds, applying a predeterminable pressure on the emulsion in the reservoir, flowing at least a portion of the emulsion agent to a position above the soil and then directing a limited amount of the emulsion at the soil to produce a spot or an impact area of the emulsion on the seeded soil having a generally circular pattern of relatively small diameter and moving said reservoir along the seed row while periodically directing limited quantities of emulsion at the soil to provide mulched spots of limited areal coverage at intervals over the seed bed.

Further objects and advantages of the invention will become apparent from the following detailed description read in light of the accompanying drawings which are a part of this specification and in which.

Figure 1:
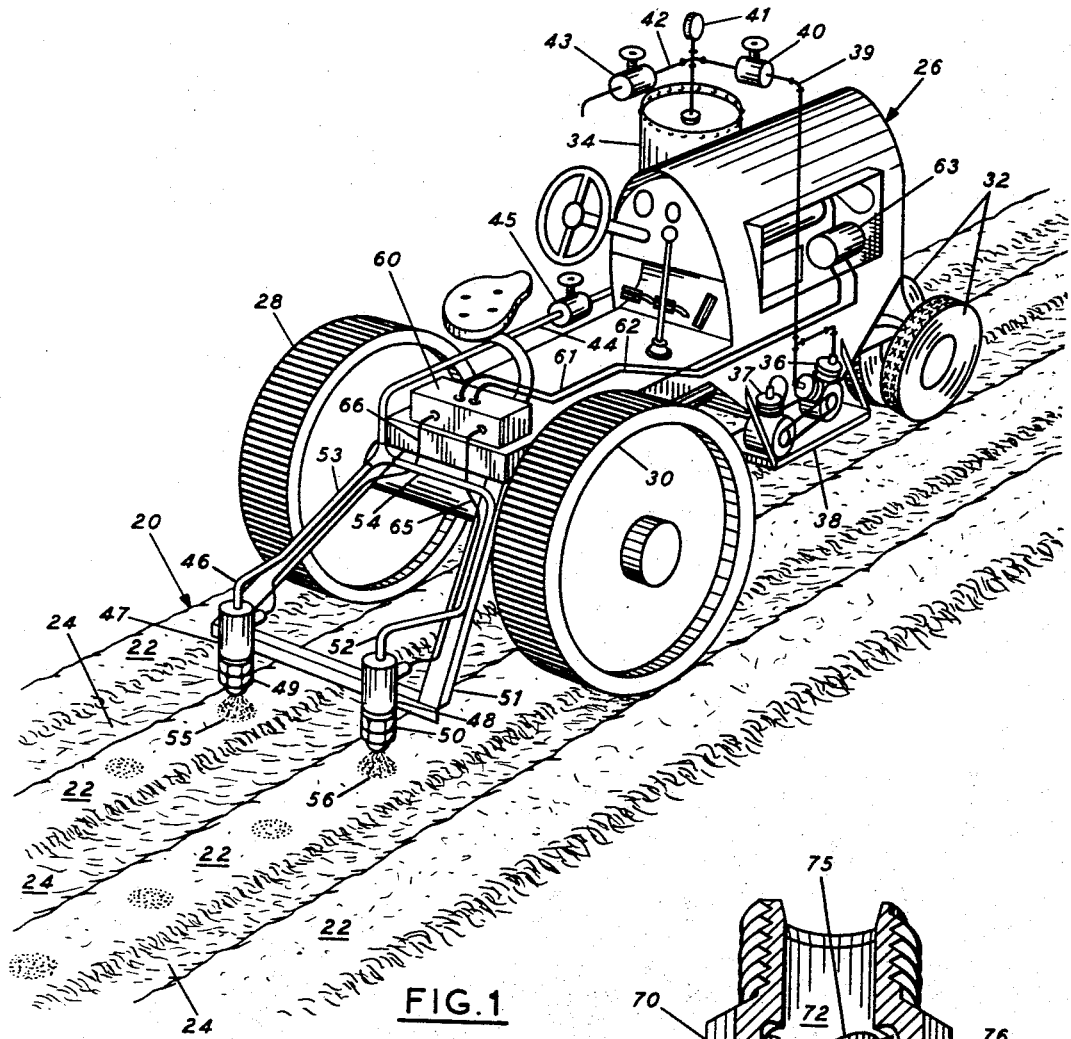
FIGURE 1 is a view illustrating an embodiment of apparatus useful in performing the method of the present invention.
Figure 2:
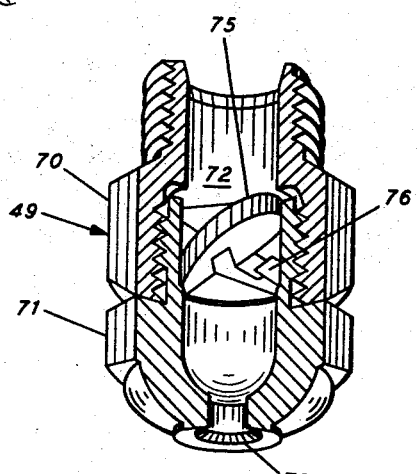
FIGURE 2 is a sectional view of a form of nozzle useful in the present invention.

In FIGURE 1 a planted field is generally represented by the numeral 20. Seeds have been sown or planted in rows 22. For example, lettuce seeds are commonly planted by a mechanical seeder which deposits a continuous stream of seeds in proper position along a row such as row 22. The planted rows 22 are spaced apart by furrows 24. The arrangement of the field in FIGURE 1 is general and similar arrangements are used with many crops.

A tractor, represented generally by numeral 26, is shown. The rear wheels 28 and 30 of the tractor run in the furrows as do the front wheels 32. The tractor 26 is a suitable movable frame from moving the apparatus of the present invention over the field 20. Reservoir means, such as tank 34, are mounted on and carried by the tractor 26. The reservoir means 34 should provide for at least 20 gallons of liquid storage capacity and preferably 40 to 50 gallons of liquid storage capacity. The reservoir means is constructed in a manner to withstand at least 50 p.s.i. A means to increase the pressure on the contents of the reservoir means is also provided. For example, a compressor 36 and drive motor 37 are mounted on the tractor 26 on platform 38. An air supply line 39 carries compressed air from the compressor through valve 40 and pressure gauge 41 to the reservoir means 34. In this manner the pressure on the reservoir may be maintained at a desired level. A blowdown line 42 is provided with a manually operated valve 43 to release the pressure on fluid in the reservoir 34 when desirable.

A conduit 44 extends out of the reservoir 34 for flowing fluid therefrom. A valve 45 is provided on the conduit 44 within easy reach of the operator of the tractor. Conduit 44, which may be divided into two or more conduits such as 53 and 54 provides a path for flowing the emulsion from the reservoir 34 to a position as indicated by numerals 46 and 52 directly above the planted field 20.

A support member 51 extends downwardly from the tractor 26. The support member is rigidly connectable on the tractor. A pair of suitable valves 47 and 48, which may be solenoid valves for example, are affixed to the frame 51. The valves 47 and 48 are connected on conduits 53 and 54 to control flow therethrough. Nozzles 49 and 50 are connected to the valves 47 and 48, respectively, to receive any flow passing therethrough. The nozzles 49 and 50 are positioned to direct a spray, as indicated by 55 and 56, at the earth. The spray leaving the nozzle is radially expanding and forms on striking the earth a generally circular pattern having a substantially constant density.

Figure 3:
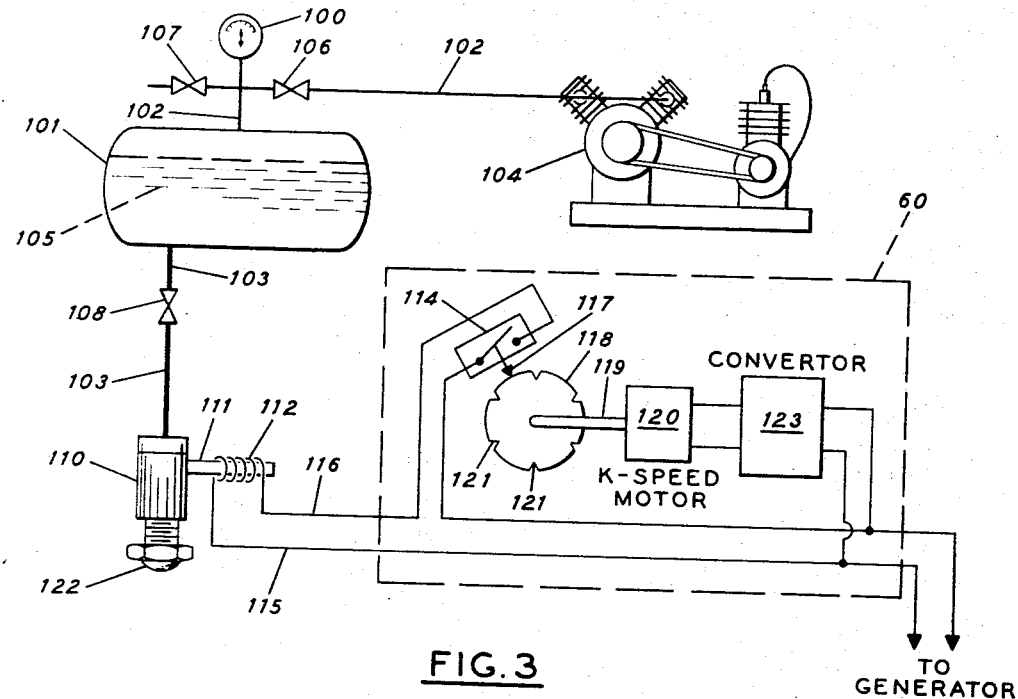
FIGURE 3 is a diagrammatic view and illustrates apparatus assembled in accordance with the invention.
Figure 4:
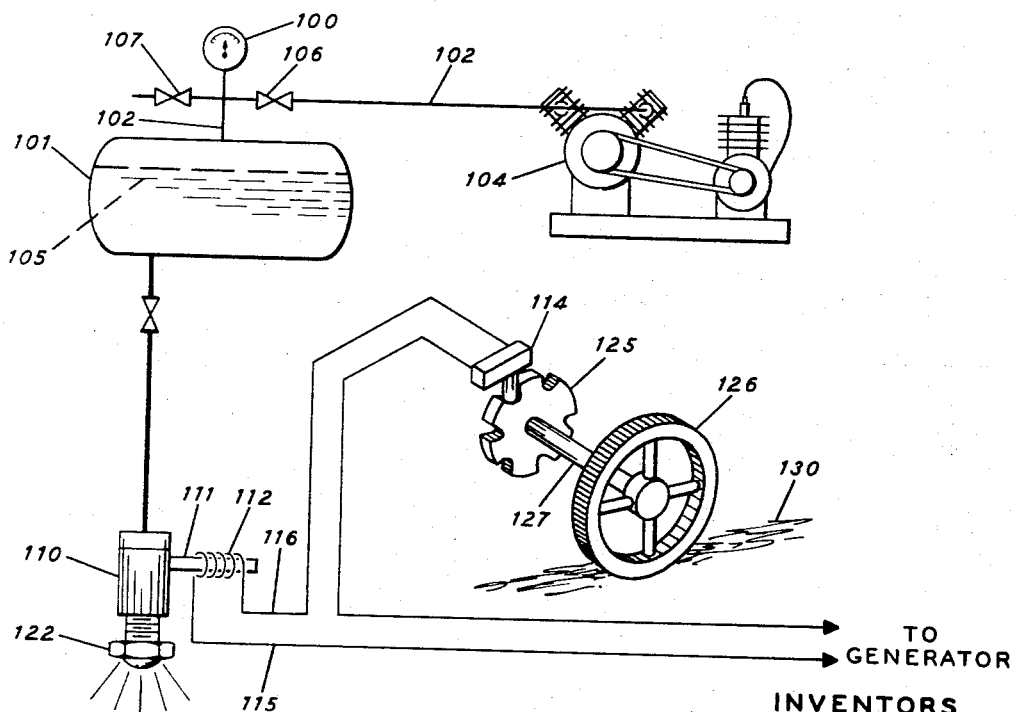
FIGURE 4 is a diagrammatic view and illustrates apparatus assembled in accordance with an alternative embodiment of the invention.

Actuating means are provided to actuate the valves 47 and 48. Thus the valves 47 and 48 are opened for a short time interval to spray the emulsion on the ground. A preferred arrangement includes the use of normally closed solenoid valves 47 and 48. An actuating means for opening and closing the valves 47 and 48 at selective periodic intervals includes a switch and timing wheel arrangement contained in box 60 and fully described below with reference to FIGURE 3. The actuating means in box 60 is supplied with current by means of leads 61 and 62 extending from the generator 63 of the tractor. Suitable electric cables 65 and 66 carry the current from box 60 to the solenoid valves 47 and 48 to operate the valves. A manual switch (not shown) may be incorporated into the electrical system at a suitable location for manual cut off of the system if desired.

A regular pattern of spot applications of the emulsion is made. The actuating device periodically opens the valves for a short time period to cause the emulsion to be sprayed on the ground in a pattern having substantially constant density. It has been found that the application of the emulsion to the soil surface need not be continuous to be effective. In fact it has been found that spot application having a generally circular pattern with a diameter as small as 2" gives satisfactory results when spaced at the desired plant spacing along the row. According to the present invention then the tractor is moved across the field in a manner to align the nozzles with the seeded rows and the actuating means is set with a predeterminable program to cause a spray of uniform density to jet from the nozzles at periodic intervals along the seed rows to provide spots of emulsion at selected intervals along the seed row.

A sectional view of a preferred form of nozzle, such as for example nozzle 49, is shown in FIGURE 2. As there shown, the nozzle comprises an upper body section 70 and a lower body section 71. A flow path 72 is provided through the interior of the body sections. The flow path has an orifice 73 which causes the emulsion flowing through the nozzle to be jetted therefrom in an expanding stream. A pair of circular discs 75 and 76 are arranged in the flow path 72 to impart a swirling motion to the emulsion passing through and to thus provide a stream having a substantially constant density. The nozzle has a delivery range from between 1.0 to 2.0 gallons per minute of a fluid having a viscosity of 10 to 200 SSF at 40 p.s.i. pressure.

With reference to FIGURE 3, the preferred embodiment of apparatus useful in the present invention is diagrammatically illustrated. The reservoir means 101 is supplied with a suitable inlet conduit 102 and an outlet conduit 103. A compressor 104 is provided to apply pressure to the emulsion 105 contained in reservoir 101. Suitable valves 106, 107 and 108 are connected, respectively, to the inlet conduit 102, the blowoff line, and the outlet conduit 103. A normally closed solenoid valve 110 is connected on conduit 103. The valve is opened when coil 112 is energized to cause core 111 to move out of and to thus open the valve. The coil is connected in series by leads 116 and 115 and is periodically electrically excited by suitable means such as the equipment shown inside of box 60. The electrical leads 115 and 116 are connected to a suitable source of current such as a generator. A normally open switch 114 is connected into conduit 116. The switch is open so long as spring-loaded push rod 117 is depressed by a notched wheel 118. The notched wheel 118 is rotated by shaft 119 driven at a constant speed by motor 120. As the push rod of the normally open switch 114 extends into each notch 121 of wheel 118, the switch is closed energizing the coil 112 to open the solenoid valve 110. The valve remains opened while the rod is in the notch. As the wheel 118 turns, the rod 117 is depressed to cause the switch to open and thus close the valve. In this manner a spot of emulsion is sprayed at periodic intervals through nozzle 122. Thus the pulsating apparatus of the invention provides spot application of emulsion at selected intervals along the seed row.

An alternative arrangement of apparatus for periodically applying a spot of emulsion to the soil is diagrammatically shown in FIGURE 4. A reservoir 101 of emulsion 105 is maintained at a suitable pressure by compressor 104. A solenoid valve 110 and nozzle 122 are connected in an appropriate location and communicate with the outlet conduit from reservoir 101. The solenoid valve 110 is normally in a closed position to prevent flow through nozzle 122. The solenoid valve 110 is opened by excitation of coil 112. The coil is excited periodically by an actuating means comprising ground wheel 126, drive shaft 127, notched wheel 125, and switch 114. The switch is in a closed position when the switch button is extended into a notch on wheel 125. When the button is depressed by the rim of the wheel 125, the switch opens to close the solenoid valve 110.

In this regard the size of and the spacing of the notches on the notched or timing wheel control the size of the spot and the location of the spots. It will be apparent that since different crops require spot applications on different centers, it is within the skill of the art to prepare a timing wheel of the proper diameter and notches of proper size.

In order to effectively prevent crusting of the soil and to promote seed germination and seedling emergence, the emulsion is applied to tthe soil in a particular manner. Thus it has been found that the emulsion to be sprayed on the soil in accordance with the present invention should have a viscosity of between about 10 and 200 SSF at 77° F. A particular mulching composition that is useful in accordance with this invention is fully described in copending application Ser. No. 295,230, filed on July 15, 1963, by Richard L. Ferm and Charles E. Moran, and owned by a common assignee. The emulsion as there described is mixed with water in an appropriate manner to provide a mulching fluid having a viscosity within a range of 10 to 200 SSF at 77° F.

The nozzle used to jet the emulsion at the soil emits the emulsion in a fine spray without breaking the emulsion. The density of the phases in the expanding spray is substantially contant to provide uniform emulsion application in the impact area. In this regard it has been discovered that beneficial results are obtained with relatively small areas of emulsion application. Areas or spots of emulsion application about 2″ to 3″ in diameter have given excellent results. It has been found that the density of an emulsion having a viscosity of 10 to 200 SSF at 77° F. when applied in this manner should be in the range of .05 gallon per square yard to .2 gallon per square yard of application. The best results are obtained in this invention by using an emulsion for spraying, which emulsion has a viscosity of between 15 and 40 SSF at 77° F.

The manner in which the spray is directed at the earth's surface is important to the successful application of the emulsion in accordance with this invention. The spray must not only be of a critical density as indicated above, it must also be directed at the ground in a particular manner. The nozzle through which the mulch is jetted must provide a radially expanding stream. The nozzle is positioned within a limited height range above the ground. It has been found that the nozzle should be between about 4″ and 8″ and preferably about 6″ above the soil surface on which the emulsion is applied. The emulsion is sprayed through a nozzle having a delivery rate of between 1 to 2 gallons per minute of a fluid having a viscosity of 10 to 200 SSF at 40 p.s.i. The pressure on the emulsion when it is delivered is adjusted to a value between about 30 and 60 p.s.i. Pressures greater than 60 p.s.i. cause the sprayed emulsion to erode the soil when striking. On the other hand the spray of emulsion is not satisfactorily atomized when the pressure on the reservoir is substantially less than 30 p.s.i. Thus the proper application of the emulsion in spots in accordance with the invention is dependent in these respects on the pressure on the reservoir.

The method of spot applying emulsion mulch in accordance with the present invention is useful with a variety of plants. Suitable plants include lettuce, sugar beets, cotton, melons, and other plants which are planted as seeds in a row. Application of the emulsion in spots has been found to result in excellent plant emergence in the spotted portions of the seed bed. Thus waste of emulsion is prevented. Further, applying the emulsion in periodic spots helps to aid in thinning the crop. Thus the spots are applied at various intervals over the seed row. For example, a desirable interval (center to center) of spots applied to lettuce is about 12 to 14 inches. Following are typical examples which illustrate the improvement in crop production in accordance with the present method:

Example I

In this case, the anticrusting or mulching treatment was applied on a lettuce field of approximately 20 acres. The treated portion consisted of two rows, approximately 1200 feet in length. These rows were on raised beds, 40 inches on centers. This treatment used the following petroleum based emulsion:

| | Percent by weight |
|---|---|
| Oronite Polybutene No. 32 | 59.6 |
| Oronite NI-W | 5.4 |
| Fresh water | 35.0 |
| | 100.0 |

This concentrated emulsion was subsequently diluted in a ratio of 1:1 with water to provide a suitable emulsion for application in accordance with the invention. This emulsion had a viscosity of approximately 30 to 40 SSF at 77° F. The Oronite Polybutene No. 32 is a liquid polymeric material produced in the plants of Chevron Chemical Company, Oronite Division. Various types of this material are sold under registered trademark designations of "Oronite Polybutenes" Nos. 24, 32, 64, 122 and 128. These materials are suitable for the preparation of emulsions for use in this invention. The Oronite NI-W is an ether of alkyl phenol useful as a liquid dispersant. It is sold under the trademark "Dispersant NI-W" by Chevron Chemical Company, Oronite Division, of San Francisco, Calif. In this material the alkyl chain contains an average of 12 to 14 carbon atoms, the number of ethylene oxide units to impart water solubility being in the range from 8 to 12. The formulation and composition of the emulsion is fully described in copending application Ser. No. 295,230 cited above. Application was made in spots approximately 2 inches in diameter at 12-inch centers over the seed rows.

The location of this trial was in the vicinity of Soledad, Calif. The field consisted of the soil type designated as Salinas clay. Irrigation was accomplished by sprinkling approximately 2 to 3 inches of water to the soil.

Approximately 21 days elapsed from the time of application of the emulsion until the observation of the test results. At the time of observation, it was noted that the untreated portion of the field had crusted badly, requiring the grower to "roll" the beds in order to break the crust. The spots which were treated with the polybutene emulsion did not crust. A healthy seedling emerged in every spot thus demonstrating the effectiveness of the emulsion or a mulch when applied in this manner. The breakthrough of seedlings in the untreated portion was spotty and erratic. Further, greater maturity was clearly apparent in the plants in the treated spots.

Example II

The treatment in this case was on melons and utilized the same emulsion as in Example I, similarly diluted with water in a 1:1 ratio to give an emulsion having a viscosity of between 30 and 40 SSF at 77° F. The field size was somewhat greater than 30 acres. The treated rows were approximately 500 feet long with 72 inches between rows. Two-inch spot applications of the emulsion were applied on approximately 72-inch centers. The trial was located near Mendota, Calif., and was on a silty, clay loam.

Approximately 20 days after treatment, during which time the field had received intermittent rains, it was noted that emergence of seedlings had occurred through each spot in the spot-treated rows. On the other hand emergence was very erratic in the untreated areas. Thus the emergence of plants in the treated spots indicates that the emulsion applied in small diameter spots in accordance with this invention is effective in preventing crusting and providing for seedling emergence with a minimum of wasting of emulsion.

Example III

In this case, a 15-acre field of broccoli was treated with the same polybutene emulsion diluted as in the previous examples. The untreated rows were about 600 feet long on raised beds, 40 inches on centers. The emulsion was applied in 2-inch spots on about 12-inch centers in accordance with the method of this invention. The trial was located near Salinas, Calif., on silty, clay loam. Irrigation was by sprinkling with about 2 to 3 inches of water which resulted in the usual crusting problems. About 20 days after the treatment it was observed that excellent emergence and maturity had been obtained in the treated area, but that the rest of the field had to be "rolled" in order to allow adequate emergence of the crop.

Example IV

The emulsified polybutene applied in this treatment was the same as in the foregoing examples. The treatment was the spot method on a 15-acre field of cauliflower, near Salinas, Calif. Spots of emulsion of approximately 2 inches in diameter were applied on 12-inch centers. The treated rows were about 200 feet long on raised beds, 40 inches on centers. The field was one of silty, clay loam. Again irrigation was by sprinkling with from 2 to 3 inches of water.

About 20 days after the treatment, it was observed, as in the other examples, that the treatment had allowed emergence of the crop without resort to rolling and had resulted in a greater number of plants emerging and in greater maturity.

Example V

Additional demonstrations were conducted to show the advantages of the present invention using an asphalt emulsion. Originally, the asphalt emulsion comprised by weight about 58 percent asphalt, about 40 percent fresh water, about 2 percent Vinsal resin and about .22 percent sodium hydroxide. Vinsal resin is a pine stump extract made by the Hercules Powder Company. The Vinsal resin has an acid number of 94 and a saponification number of 165. The molecular weight of the resin is 470, and the density is 1.218 at 25° C. The $CH_3O$ content is 5.3 percent. The above asphalt emulsion was diluted with an equal weight of water to make an emulsion suitable for use in the present invention. The final emulsion had a viscosity between about 15 to 18 SSF at 77° F. Spots of emulsion of from about 2½ to 3½ inches were formed on the soil in accordance with the present invention. After 16 days soil samples were taken at depths of from 0 to 1 inch and from 1 to 3 inches under the mulched spots and also, for comparison purposes, between the spots in an untreated area. Table 1 below shows the results of these tests. It is noted that the average moisture of the soil in the spotted area is significantly higher than the moisture in the untreated areas immediately adjacent. The moisture content is a means of indicating the improved soil condition due to the asphalt emulsion.

TABLE 1

| | Sample Can No. | Wet Weight, gms. | Dry Weight, gms. | Tare Weight, gms. | Loss on Drying, gms. | Net Dry Sample Weight | Percent Moisture |
|---|---|---|---|---|---|---|---|
| Mulched Spots 0″–1″ Sample Depth | 1 | 45.4 | 43.7 | 29.7 | 1.7 | 13.4 | 12.7 |
| | 5 | 44.1 | 42.1 | 30.0 | 2.0 | 12.2 | 16.5 |
| | 9 | 45.2 | 42.8 | 29.1 | 2.4 | 13.7 | 17.5 |
| Avg | | | | | | | 15.56 |
| Check Area 0″–1″ Sample Depth | 3 | 43.4 | 41.4 | 29.4 | 2.0 | 12.0 | 16.7 |
| | 7 | 45.2 | 43.8 | 29.2 | 1.4 | 14.6 | 9.6 |
| | 11 | 46.2 | 44.2 | 30.0 | 2.0 | 14.2 | 14.0 |
| Avg | | | | | | | 13.43 |
| Mulched Spots 1″–3″ Sample Depth | 2 | 62.7 | 57.0 | 30.0 | 5.7 | 27.0 | 21.1 |
| | 6 | 58.1 | 52.9 | 30.3 | 5.2 | 22.6 | 23.0 |
| | 10 | 57.7 | 52.4 | 30.2 | 5.3 | 22.2 | 23.9 |
| Avg | | | | | | | 22.66 |
| Check Area 1″–3″ Sample Depth | 4 | 62.2 | 56.0 | 29.8 | 6.2 | 26.2 | 23.7 |
| | 8 | 57.9 | 52.5 | 29.3 | 5.4 | 23.2 | 16.9 |
| | 12 | 58.0 | 52.7 | 30.0 | 5.3 | 22.7 | 23.3 |
| Avg | | | | | | | 21.63 |

In accordance with the method of the invention, there is also an application wherein the spot application of the emulsion is used with a second treatment to assist in promoting growth of crops at selected intervals and to thus at least partially, if not completely, eliminate the need for manual thinning of the crops. For example, it has been found that if a seeded field of a crop such as lettuce is treated with the emulsion by spot application as described herein and then the entire field is watered, a crust will form on the untreated, watered portion of the field. However, no crust will form on the portions of the field which were spotted with emulsion prior to the watering. The crust hinders or partially impedes emergence and growth of the crusted portion. In the mulched spots, however, which have no crust, seedlings emerge and grow. Thus the need for hand thinning is eliminated or at least greatly reduced.

In a further embodiment of the invention the emulsion is applied by the spotting technique to a row of plants which have already emerged and are growing. Thus in the case of lettuce, for example, where a crowded row of seedlings emerge and it is desired to thin out the row and have plants mature at selected intervals, the emulsion would be spotted on the lettuce at the desired intervals. A substance which normally kills the lettuce but which does not affect the mulched portion of the lettuce is then applied to the whole field. The unmulched lettuce will be killed while the mulched portion will survive and grow. If, for example, it is desired to automatically thin the lettuce field of Example I above, the mulching treatment using the petroleum based emulsion is first done after the seedlings emerge. Then the entire field is sprayed with a material such as oil which will kill the seedlings in the untreated areas. Materials other than oil which will serve the same or similar purpose include various herbicides.

It is apparent that modifications other than those described herein may be made to the embodiments of this invention without departing from the inventive concept. It is intended that the invention embrace all equivalents within the scope of the appended claims.

We claim:
1. A method of treating a field with a petroleum based emulsion mulch comprising the steps of establishing a movable supply of a petroleum based emulsion having a viscosity of between 10 and 200 SSF at 77° F., moving said supply over a seed bed in a field, increasing the pressure on said emulsion to a value of between 30 and 60 p.s.i., flowing a portion of said emulsion to a position between about 4 and 8 inches above the surface of the field, directing a portion of emulsion from said position in a stream of substantially constant density at the seed bed in said field to produce a spot of emulsion on the seed bed in said field having a diameter of about 2 to 3 inches and continuing to move said supply over said field while periodically directing additional portions of the emulsion from said position at the seed bed in said field to produce spots of emulsion at predetermined intervals on the seed bed in the field.

2. The method of claim 1 further characterized in that the emulsion is an asphalt emulsion.

3. The method of claim 1 further characterized in that the emulsion is a polybutene emulsion.

References Cited

UNITED STATES PATENTS

| 2,909,869 | 10/1959 | Dresser et al. | 47—58 |
| 3,061,974 | 11/1962 | Louis et al. | 47—9 |
| 3,261,127 | 7/1966 | Ferm et al. | 47—58 |

FOREIGN PATENTS

| 205,273 | 9/1959 | Austria. |
| 212,372 | 1/1958 | Australia. |

ABRAHAM G. STONE, *Primary Examiner.*

R. E. BAGWILL, *Assistant Examiner.*